(12) United States Patent
Epstein

(10) Patent No.: US 6,199,754 B1
(45) Date of Patent: Mar. 13, 2001

(54) SELF-SERVICE TERMINAL

(75) Inventor: Howard I. Epstein, Rockville, MD (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/177,746

(22) Filed: Oct. 23, 1998

(30) Foreign Application Priority Data

Dec. 20, 1997 (GB) .................................................. 9726834

(51) Int. Cl.⁷ ........................................................ G06F 17/60
(52) U.S. Cl. .............................. 235/379; 235/381; 705/43
(58) Field of Search ................................... 235/375, 379, 235/380, 381; 348/150; 705/43; 902/6, 8, 20, 30, 31, 32, 35

(56) References Cited

U.S. PATENT DOCUMENTS

| 3,943,335 | * | 3/1976 | Kinker et al. | 235/379 |
|---|---|---|---|---|
| 4,420,751 | * | 12/1983 | Paganini et al. | 235/379 X |
| 4,511,794 | * | 4/1985 | Imamichi | 235/379 |
| 4,567,359 | * | 1/1986 | Lockwood | 235/381 |
| 4,795,889 | * | 1/1989 | Matuura et al. | 235/379 |
| 4,942,464 | * | 7/1990 | Milatz | 902/6 X |
| 5,097,328 | | 3/1992 | Boyette | 348/150 |
| 5,519,669 | * | 5/1996 | Ross et al. | 902/6 X |
| 5,541,835 | * | 7/1996 | Dextraze et al. | 705/10 |
| 5,600,114 | * | 2/1997 | Dunlap et al. | 235/379 |
| 5,615,391 | * | 3/1997 | Klees | 710/19 |
| 5,780,825 | * | 7/1998 | Sato et al. | 235/379 |
| 5,915,246 | * | 6/1999 | Patterson et al. | 705/43 |

FOREIGN PATENT DOCUMENTS

| 2283601 | | 5/1995 | (GB) . |
|---|---|---|---|
| 3-246672 | * | 11/1991 | (JP) . |
| 7-105274 | * | 4/1995 | (JP) . |

\* cited by examiner

*Primary Examiner*—Karl D. Frech
*Assistant Examiner*—Jared J. Fureman
(74) *Attorney, Agent, or Firm*—Francis L. Conte

(57) ABSTRACT

A self-service terminal such as an ATM (10) is co-located with a human-form recognition engine such as a camera (22) and appropriate software (23). If there is no user adjacent the ATM (10), the ATM screen 12 is operated as an advertising bill board. If one person or a short queue is present, the ATM (10) provides a full range of services on demand. For a longer queue, the services available are limited, e.g. one transaction per user or only one type of transaction such as cash dispense only. For a bank of ATMs (10A to 10D), different ATMs are arranged to provide different services. Each ATM has a service indicator (19A to 19D) to indicate the service or services available.

18 Claims, 2 Drawing Sheets

SELF-SERVICE TERMINAL

BACKGROUND OF THE INVENTION

This invention relates to a self-service terminal (SST) such as an automated teller machine (ATM). It is known to provide an ATM having a number of functions such as cash dispense, cash deposit, cheque deposit, account inquiry, receipt print, and statement print which are available to a user on demand. Other types of SST which do not have a cash dispense facility may have facilities to allow inquiries about sporting or cultural events and to supply tickets for such events, or to allow inquiries about loans or insurance or financial services.

If a user makes a lengthy inquiry or initiates a series of financial transactions, other potential users may be discouraged and decide not to wait, so that business may be lost. To overcome this problem, some ATMs are programmed so that at predictable busy periods they operate, for example, only to dispense cash, and will not accept deposits. However the ATM must be pre-programmed to change its operation at certain times of day and on certain days of the week, and at best the time change will be an educated guess. Further, the time changes may need frequent revalidation and updating to maintain efficiency.

In U.S. Pat. No. 5,097,328 a queue-sensing arrangement is disclosed which may be used in a bank lobby to gather data on the queue length of customers waiting to be served, and therefore to gather data on teller availability, teller efficiency, and on the volume of business transactions. The data can be used to plan staffing levels or to anticipate peak customer demand. Such an arrangement is known as customer activity analysis, (CAA) and the camera and processing software used in such an arrangement is known as a human-form recognition engine.

SUMMARY OF THE INVENTION

It is the object of the invention to apply the known principle of customer activity analysis in combination with a self-service terminal.

According to the invention a responsive self-service terminal system characterized by a self-service terminal arranged to provide a plurality of services, a human-form recognition means arranged to sense a number of persons beside the terminal, and control means to vary the services provided by the terminal in accordance with the sensed number.

Also according to the invention a method of controlling a self-service terminal which provides a plurality of services characterized by sensing the number of persons adjacent the terminal and varying the services provided in accordance with the sensed number.

Further according to the invention a method of controlling a system comprising a plurality of self-service terminals each providing a plurality of services, characterized by sensing the number of persons adjacent the terminals and varying the services provided so that at least one terminal provides a service which differs from the services provided by the other terminal.

BRIEF DESCRIPTION OF THE DRAWINGS

The invention will now be described by way of example only with reference to the accompanying drawings.

DETAILED DESCRIPTION

Figure 1:
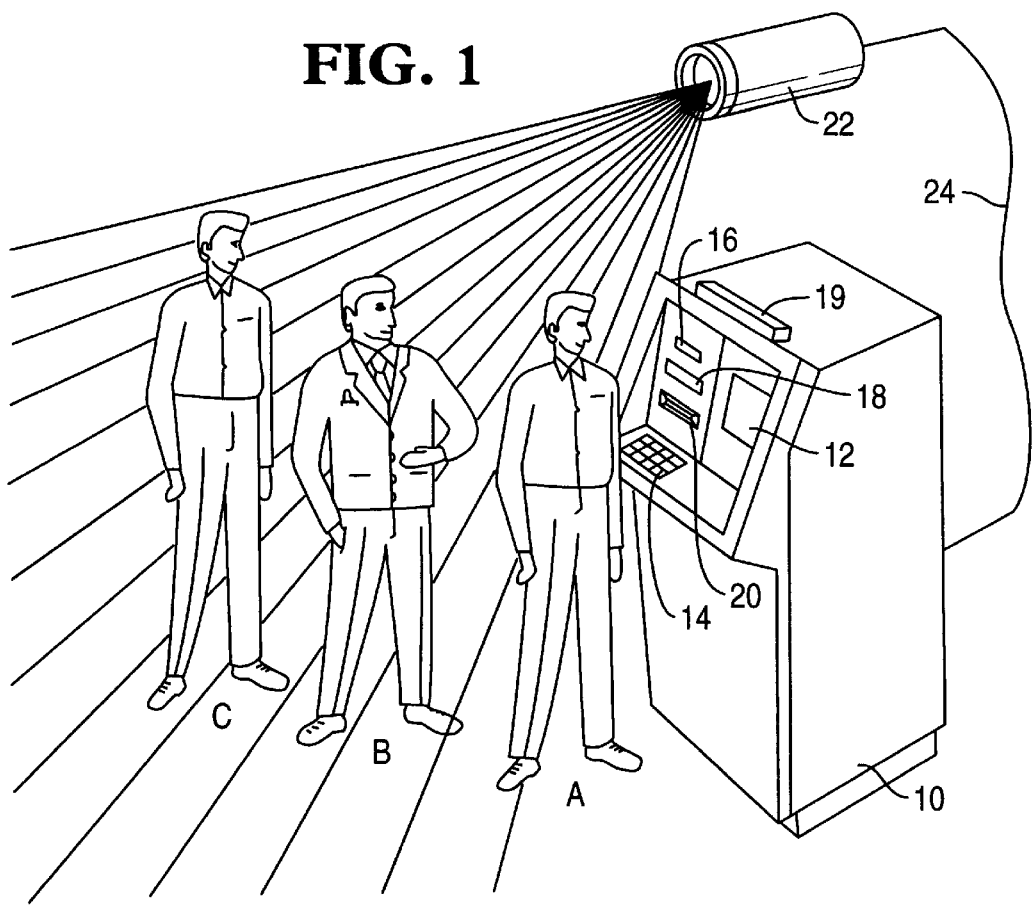
FIG. 1 illustrates an adaptive SST system comprising a single ATM.

In FIG. 1 an ATM 10 has a display screen 12, a keyboard 14, a card slot 16, a cash delivery slot 18 and a cheque or cash deposit slot 20. Above the ATM a camera 22 is connected to the ATM by a cable 24. The camera is positioned to sense the presence in front of the ATM 10 of either a single user A, or a short queue of users A,B,C. On top of the ATM 10 is a service indicator display 19.

Figure 2:
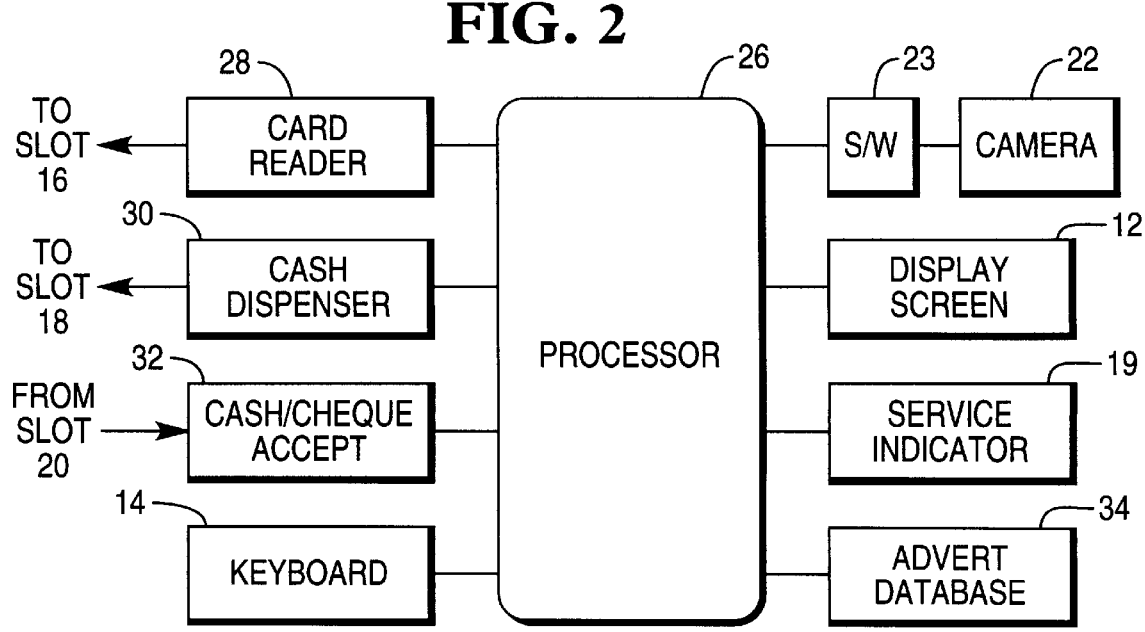
FIG. 2 illustrates the operative parts of the FIG. 1 system.

FIG. 2 shows the central processor 26 of the ATM 10, connected to the display screen 12 and the camera 22, to a card reader 28 connected to card slot 16, to a cash dispenser 30 connected to the slot 18, to a cash/cheque accept mechanism 32 connected to the deposit slot 20, and to the service indicator 19. The processor 26 is also connected to a database 34 of advertisements or other promotional material. All of the above parts of the system are known individually and will not be further described.

The camera 22 and its associated image processing software 23 comprise a commercially-available human-form recognition engine such as that available from NCR Corporation, NCR's Customer Activity Analysis (CAA) system available from the Human Interface Technology Center (HITC) group located in Atlanta, Ga. The software provides signals which are supplied to the processor 26 to indicate whether 1, 2, 3 or more persons are standing adjacent the ATM 10, or whether no one is present.

If no one is present, the processor 26 accesses the data base 34 to provide promotional material. This can be a repeating multimedia message, designed to attract attention; the ATM 10 is in effect acting as a billboard.

If one person is present, the processor 26 disables the promotional material, and activates all available services of the ATM 10 for the user A to select. The services may be selected in succession if required.

If two persons are sensed, then optionally all available services are still enabled.

During the three situations just described, the processor 26 causes the service indicator 19 to display a message such as "all services available" or "cash dispense, cash deposit, cheque deposit" or other appropriate message.

If three persons A,B,C or more are sensed by the camera 22, the processor 26 then limits the services available at the ATM 10. For example, the processor may enable only a cash dispense service, and then also causes the service indicator 19 to display the message "cash dispense only". Alternatively, the processor may disable multiple service requests by the same user using the same user card and PIN code, and display a message "single transaction only".

In a system according to the invention, the services provided are adapted to the local condition i.e. the number of persons queuing to use the ATM. The efficiency of the ATM is thereby increased, and user irritation at having to wait for a previous user to finish a transaction is thereby reduced. In addition, the inactive time of the ATM is used, either to advertise the services of the bank which operates it, or, by provision of third party advertisements, to generate income from the advertising function.

Figure 3:
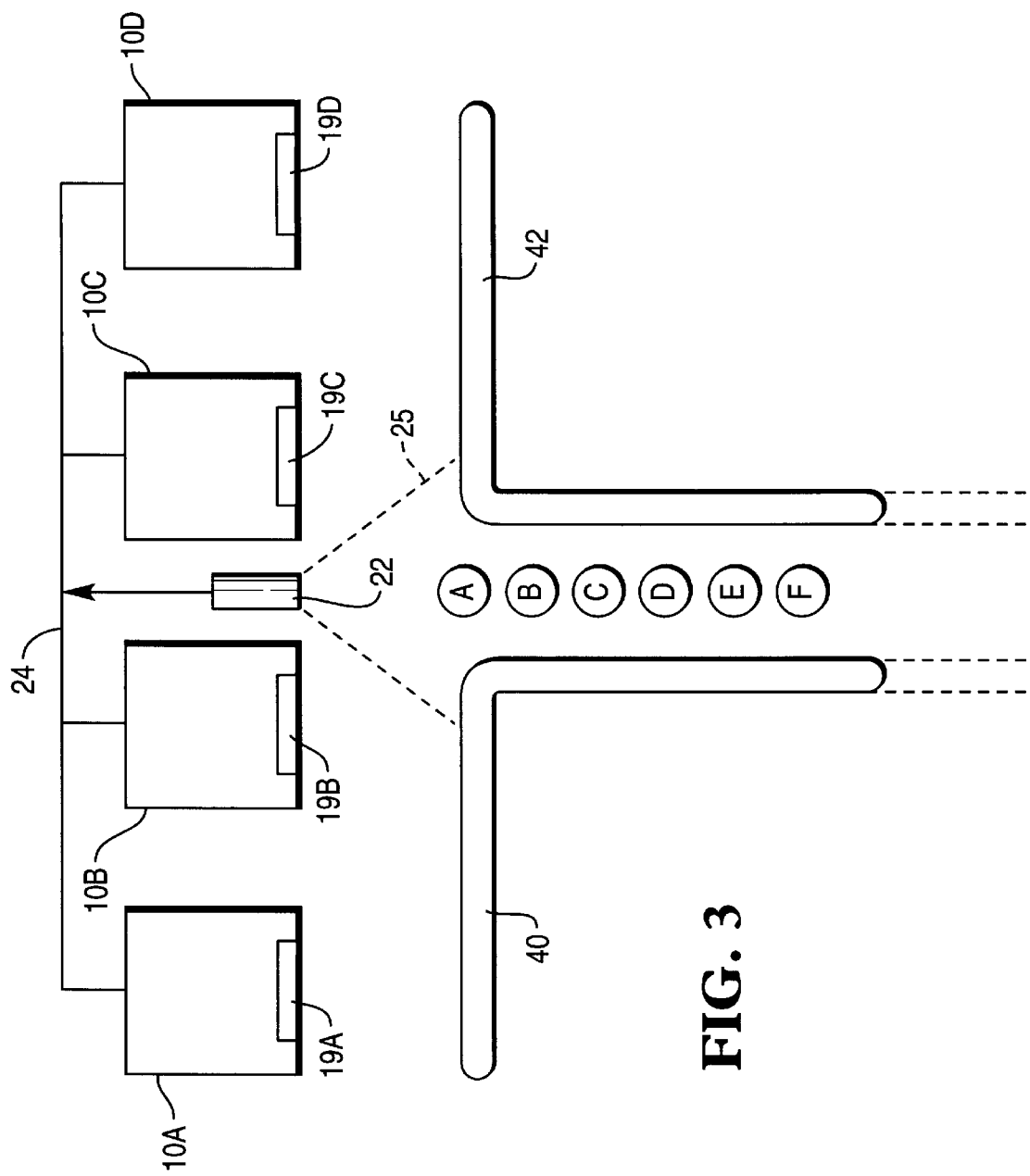
FIG. 3 illustrates an adaptive SST system comprising several ATMs.

FIG. 3 shows a plan view of four ATMs 10 A to D, each having a service indicator 19 A to D and each connected by a cable 24 to camera 22.

The customers in A,B,C,D,E,F etc. are channeled into a single queue by barriers 40,42 so that the queue is within the field of view 25 of the camera 22.

In this embodiment the processors in the four ATMs are programmed to operate differently in response to the signals from the camera software indicating a queue longer than a predetermined number of persons. For example, all ATMs may offer the full range of services while the queue length is between, for example, one and four persons. For a longer queue, ATMs 10A, 10B and 10C may be operated to offer only a cash dispense service while ATM 10D offers only a cash/cheque deposit service, the service indicators 19A to 19D displaying the appropriate message. The length of queue at which service limitation is initiated, and the mix of services offered by each ATM, can naturally be varied to suit the location, under the control of the organization operating the ATMs.

What is claimed is:

1. A responsive self-service terminal system comprising:

a self-service terminal for providing a plurality of on-demand services;

human-form recognition means for sensing a number of people in a queue beside the terminal; and control means for varying the on-demand services provided by the terminal from one to all in accordance with the sensed number; and wherein said on-demand services are selected from the group consisting of cash dispense, cash deposit, cheque deposit, account inquiry, receipt print, statement print, and inquires for loans, insurance, financial services, sporting events, and cultural events, and obtaining tickets for said events.

2. A responsive self-service terminal system according to claim 1, wherein a promotional advertising service is provided if the sensed number is zero.

3. A responsive self-service terminal system according to claim 1, wherein the terminal provides a plurality of on-demand services if the sensed number is between one and a predetermined number.

4. A responsive self-service terminal system according to claim 3, wherein the terminal provides a restricted on-demand service if the sensed number is equal to or greater than the predetermined number.

5. A responsive self-service terminal system according to claim 1, further comprising at least another self-service terminal for providing a plurality of services, the control means being arranged to vary the services provided at each terminal so that at least one terminal provides a different service relative to the other terminal.

6. A responsive self-service terminal system according claim 5, wherein each self-service terminal is an automated teller machine having a display, an input device, a cash dispenser, and a cash/cheque acceptor.

7. A method of controlling a self-service terminal which provides a plurality of on-demand services, the method comprising the steps of:

(a) sensing the number of people in a queue adjacent the terminal; and (b) varying the on-demand services provided from one to all in accordance with the sensed number; and wherein said on-demand services are selected from the group consisting of cash dispense, cash deposit, cheque deposit, account inquiry, receipt print, statement print, and inquires for loans, insurance, financial services, sporting events, and cultural events, and obtaining tickets for said events.

8. A method of controlling a system including a plurality of self-service terminals each providing a plurality of on-demand services, the method comprising the steps of:

(a) sensing the number of people in a queue adjacent the terminal; and (b) varying the on-demand services provided from one to all so that at least one terminal provides a service which differs from the services provided by another terminal; and wherein said on-demand services are selected from the group consisting of cash dispense, cash deposit, cheque deposit, account inquiry, receipt print, statement print, and inquires for loans, insurance, financial services, sporting events, and cultural events, and obtaining tickets for said events.

9. A self-service terminal comprising:

means for providing a plurality of on-demand services available to a user;

means for sensing the number of people in a queue to use said terminal; and means for limiting said on-demand services to less than all and more than one thereof in response to the sensed number of people; and wherein said on-demand services are selected from the group consisting of cash dispense, cash deposit, cheque deposit, account inquiry, receipt print, statement print, and inquires for loans, insurance, financial services, sporting events, and cultural events, and obtaining tickets for said events.

10. A terminal according to claim 9 wherein said limiting means are effective for permitting user access to all said on-demand services for a single person sensed in said queue.

11. A terminal according to claim 10 wherein said limiting means are effective for permitting user access to all said on-demand services for a predetermined plurality of people sensed in said queue.

12. A terminal according to claim 11 wherein said limiting means are effective for limiting user access to said on-demand services when people sensed in said queue exceed said predetermined plurality.

13. A terminal according to claim 12 further comprising means for displaying a message to said user to identify said limited on-demand services effected by said limiting means.

14. A terminal according to claim 12 in the form of an automated teller machine for effecting on-demand banking services including dispensing money.

15. A plurality of terminals according to claim 9 arranged in a multiple bank thereof, with said limiting means thereof being effective for differently limiting said on-demand services at each of said terminals in said bank.

16. A bank of terminals according to claim 15 further comprising a common queue, and said corresponding limiting means are responsive to the sensed number of people in said common queue.

17. A bank of terminals according to claim 16 wherein said sensing means are common to all said terminals of said bank, and are operatively joined to said corresponding limiting means thereof.

18. A bank of terminals according to claim 17 wherein said terminals are automated teller machines for providing on-demand banking services including dispensing cash.

* * * * *